(12) United States Patent
Hasegawa et al.

(10) Patent No.: US 10,241,703 B2
(45) Date of Patent: Mar. 26, 2019

(54) MULTIVOLUME GROUP MANAGEMENT (71) Applicant: International Business Machines Corporation, Armonk, NY (US)

(72) Inventors: Tohru Hasegawa, Tokyo (JP); Hiroshi Itagaki, Yokohama (JP); Tsuyoshi Miyamura, Yokohama (JP); Hiroki Nishiyama, Chiba (JP); Terue Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 15/187,912

(22) Filed: Jun. 21, 2016

(65) Prior Publication Data

US 2017/0364297 A1  Dec. 21, 2017

(51) Int. Cl.
*G06F 3/06* (2006.01)
*G06F 12/10* (2016.01)
*G06F 11/20* (2006.01)

(52) U.S. Cl.
CPC .......... *G06F 3/0629* (2013.01); *G06F 3/0605* (2013.01); *G06F 3/0659* (2013.01); *G06F 3/0665* (2013.01); *G06F 3/0686* (2013.01); *G06F 11/2094* (2013.01); *G06F 12/10* (2013.01); *G06F 2201/805* (2013.01); *G06F 2212/152* (2013.01); *G06F 2212/213* (2013.01); *G06F 2212/261* (2013.01)

(58) Field of Classification Search
CPC ........ G06F 3/06; G06F 3/0629; G06F 3/0605; G06F 3/0659

USPC ......................................................... 714/6.3
See application file for complete search history.

(56) References Cited

U.S. PATENT DOCUMENTS

| 6,260,006 | B1 * | 7/2001 | Wong ................... G06F 3/0607 703/24 |
| 6,298,439 | B1 * | 10/2001 | Beglin .................. G06F 3/0607 711/111 |
| 6,862,656 | B2 | 3/2005 | Trimmer et al. |
| 7,631,023 | B1 * | 12/2009 | Kaiser .................... G06F 3/061 |

(Continued)

FOREIGN PATENT DOCUMENTS

| JP | 10508131 A | 8/1998 |
| JP | 2001319399 A | 11/2001 |

(Continued)

*Primary Examiner* — Kamini B Patel
(74) *Attorney, Agent, or Firm* — James H. Mayfield; Arnold B. Bangali (57) ABSTRACT

A multivolume management method, executed by a computer, includes storing a dataset over a plurality of media storage devices, wherein the plurality of media storage devices has a corresponding plurality of physical identifiers, generating a conversion table that assigns the plurality of physical identifiers to a corresponding plurality of sequentially ordered virtual identifiers, wherein each physical identifier is uniquely assigned to one virtual identifier, receiving a request for the dataset, wherein the request references the plurality of sequentially ordered virtual identifiers, in response to receiving the request, generating a response comprising an ordered list of physical identifiers using the conversion table, and responding to the request with the response. A computer system and computer program product corresponding to the above method are also disclosed herein.

20 Claims, 6 Drawing Sheets

(56) References Cited

U.S. PATENT DOCUMENTS

| | | |
|---|---|---|
| 8,140,779 B2 | 3/2012 | Topham et al. |
| 8,458,391 B2 | 6/2013 | Itoh |
| 8,756,392 B2 | 6/2014 | Matsui et al. |
| 2002/0004883 A1* | 1/2002 | Nguyen ............... G06F 3/0613 711/111 |
| 2003/0065882 A1* | 4/2003 | Beeston ............... G06F 3/0613 711/111 |
| 2003/0065903 A1* | 4/2003 | Ashton ................ G06F 3/0601 711/172 |
| 2004/0044842 A1* | 3/2004 | Trimmer .............. G06F 3/0605 711/111 |
| 2004/0078639 A1* | 4/2004 | Anna ................. G06F 11/1469 714/6.11 |
| 2006/0010285 A1* | 1/2006 | Georgis ............... G06F 3/0607 711/111 |
| 2007/0008641 A1* | 1/2007 | Tada .................. G11B 15/682 360/69 |
| 2007/0211366 A1* | 9/2007 | Chamorro ............ G11B 15/682 360/69 |
| 2008/0126723 A1* | 5/2008 | Ashton .............. G06F 11/1456 711/162 |
| 2008/0155319 A1* | 6/2008 | Duncan ............. G06F 11/1448 714/13 |
| 2008/0222344 A1* | 9/2008 | Upadhyayula ........ G06F 3/0607 711/4 |
| 2009/0240877 A1* | 9/2009 | Taniyama ............ G06F 3/0605 711/111 |
| 2010/0265807 A1* | 10/2010 | Thompson ............ G11B 5/86 369/53.41 |
| 2011/0238929 A1* | 9/2011 | Itoh ................. G06F 3/0607 711/154 |

FOREIGN PATENT DOCUMENTS

| | | |
|---|---|---|
| JP | 2010027189 A | 2/2010 |
| WO | 2015145671 A1 | 10/2015 |

\* cited by examiner

| PHYSICAL ID | VIRTUAL ID |
|---|---|
| PHY-001 | V5001 |
| PHY-003 | V5002 |
| PHY-003 | V5003 |
| PHY-004 | V5004 |
| PHY-005 | V5005 |

FIG. 3A

| PHYSICAL ID | VIRTUAL ID |
|---|---|
| PHY-001 | V5001 |
| PHY-003 | V5002 |
| PHY-006 | V5003 |
| PHY-004 | V5004 |
| PHY-005 | V5005 |

MULTIVOLUME GROUP MANAGEMENT

BACKGROUND OF THE INVENTION

The present invention relates generally to storage systems, and more specifically, to the management of datasets that span multiple storage volumes.

In the field of storage systems, a dataset that is too large to fit on any one single storage volume may be stored over multiple volumes. When a dataset spans multiple volumes, it is important to manage all of the volumes as a group. One problem with multivolume group management is keeping the volumes in a coherent order, especially when individual volumes become corrupt and require replacement volumes.

SUMMARY

As disclosed herein, a multivolume management method, executed by a computer, includes storing a dataset over a plurality of media storage devices, wherein the plurality of media storage devices has a corresponding plurality of physical identifiers, generating a conversion table that assigns the plurality of physical identifiers to a corresponding plurality of sequentially ordered virtual identifiers, wherein each physical identifier is uniquely assigned to one virtual identifier, receiving a request for the dataset, wherein the request references the plurality of sequentially ordered virtual identifiers, in response to receiving the request, generating a response comprising an ordered list of physical identifiers using the conversion table, and responding to the request with the response. A computer system and computer program product corresponding to the above method are also disclosed herein.

DETAILED DESCRIPTION

Embodiments of the present invention relate generally to storage systems, and more specifically, to the management of datasets that span multiple storage volumes. Datasets that are too large for any one storage medium, or volume, must be stored across several volumes. In order to access such a dataset in its entirety, all of its volumes must be available. An important aspect of multivolume dataset management is maintaining an accurate accounting of all of the volumes. To ensure the proper sequence and contiguity of the dataset, it is important to keep the volumes in the correct order as well.

One approach is to physically label each volume. However, when a volume becomes corrupt or is otherwise replaced, the replacement volume's label may not conform to the labelling system. Thus, it is necessary to manage multivolume groups using labels that correspond to each volume's identifier.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter. The present invention will now be described in detail with reference to the figures.

Figure 1:
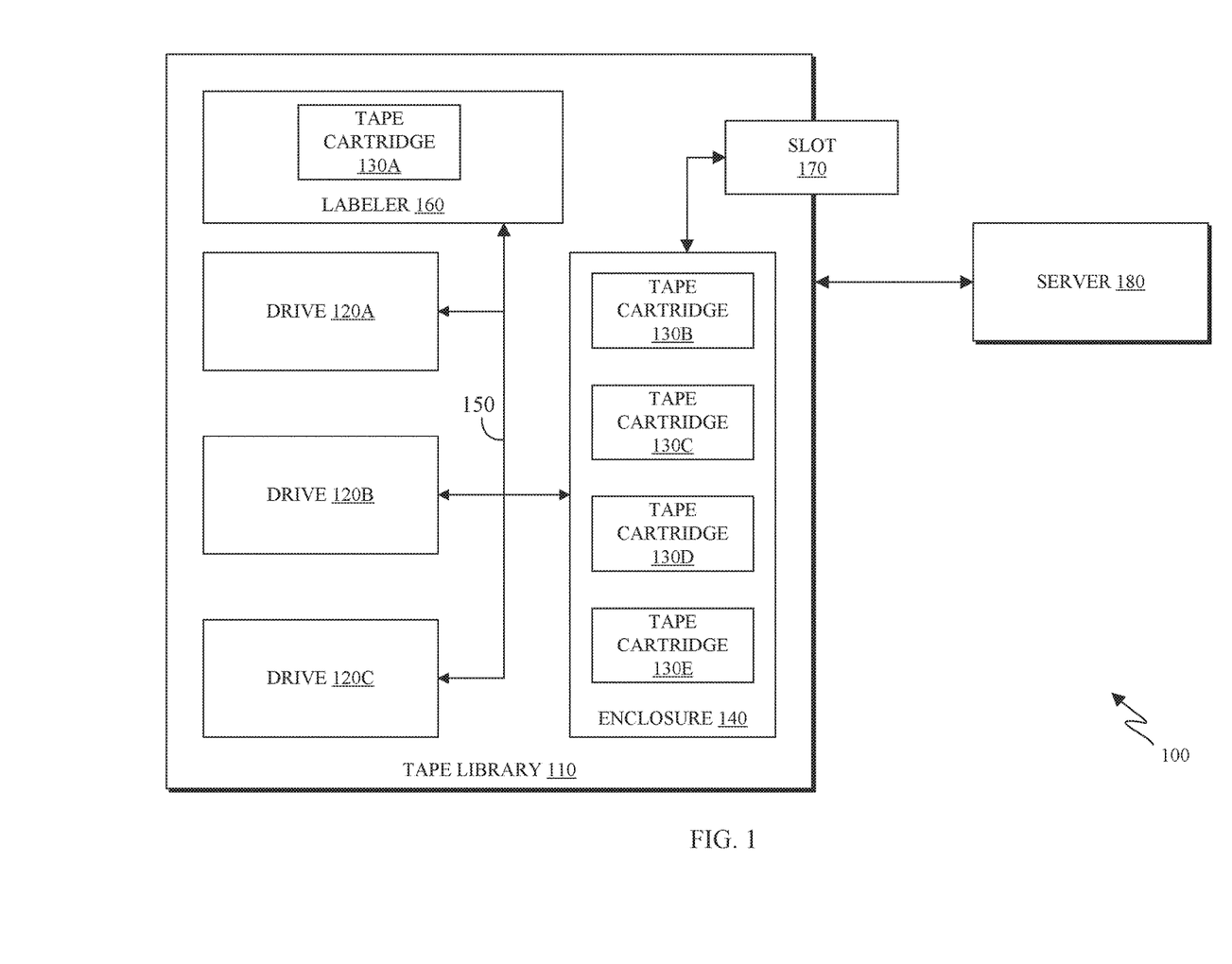
FIG. 1 is a block diagram depicting an example of a multivolume management system in accordance with embodiments of the present invention.

FIG. 1 is a block diagram depicting an example of a multivolume management system 100 in accordance with embodiments of the present invention. As depicted, multivolume management system 100 includes tape library 110, drives 120A-120C, tape cartridges 130A-130E, enclosure 140, robot 150, labeler 160, slot 170, and server 180. Tape library 110 may enable server 180 to access data on tape cartridges loaded into tape library 110. Tape library 110 may also label tape cartridges in order to organize or otherwise manage multivolume datasets.

Tape library may include multiple drives 120A-120C, tape cartridges 130A-130E in enclosure 140, robot 150, labeler 160, and import/export slot 170. Drives 120A-120C may include any data storage device that is capable of receiving tape cartridges in order to read and write data to/from the cartridge. Tape cartridges 130A-130E may include any sort of magnetic tape storage device that is compatible with one or more of the drives 120A-120C. Tapes that are not currently inserted into a drive may be stored in enclosure 140. In some embodiments, there are more or fewer drives in tape library 110, and/or enclosure 140 may hold more or fewer tape cartridges.

Robot 150 may include any automated means of loading and unloading tapes from enclosure 140 into a drive. In some embodiments, robot 150 identifies particular tape cartridges by scanning an identifying barcode associated with each tape cartridge. To eliminate redundant scanning, robot 150 may keep track of the location of previously-identified tape cartridges within enclosure 140. In one embodiment, robot 150 receives instructions from server 180 to select a tape cartridge from enclosure 140 and insert the tape cartridge in an available drive. For example, robot 150 may select and remove tape cartridge 130C from enclosure 140 and insert tape cartridge 130C in drive 120B. Tape library may monitor the availability of drives (e.g.

whether or not a drive currently has a tape loaded into it), or may be instructed as to the availability of drives by tape library 110, server 180, or the like.

Labeler 160 may label tape cartridges according to an organizational system. In some embodiments, labeler 160 receives instructions from server 180 to label or relabel a tape cartridge. As depicted in FIG. 1, tape cartridge 130A is positioned such that it is available for labeling by labeler 160. Thus, server 180 may provide instructions to labeler 160 to label or relabel tape cartridge 130A. Labeler 160 may print an adhesive barcode label and adhere the label to a tape cartridge. If relabeling, labeler 160 may remove a previous label, or apply an adhesive label over a label being replaced. In some embodiments, labeler 160 labels a tape cartridge with by writing to a memory storage device associated with the tape cartridge, such as an RFID tag, which may be rewriteable. In response to instructions from server 180, robot 150 may remove tape cartridges from enclosure 140 and place in a location accessible to labeler 160 for labeling.

Slot 170 may provide access to tape library 110 so that tape cartridges can be imported and exported from enclosure 140. Slot 170 may provide manual access to cartridge storage areas in enclosure 140. In some embodiments, robot 150 transfers tape cartridges to and from slot 170 for import and export. For example, in response to a request from server 180, robot 150 may transfer a cartridge from slot 170 into enclosure 140, or remove a cartridge from enclosure 140 and export the cartridge via slot 170.

Sever 180 may include any computer capable of interfacing with tape library 110 in order to read and/or write datasets to/from tape cartridges. In some embodiments, server 180 manages multivolume datasets by tracking the location of tape cartridges in enclosure 140 and/or drives 120A-120C, as well as how datasets are defined (e.g. as ranges of physical IDs or virtual IDs). Server 180 may instruct labeler 160 to label tape cartridges with physical labels. In some embodiments, server 180 stores, generates, and updates conversion tables, such as conversion table 300 in FIGS. 3A and 3B.

Figure 2:
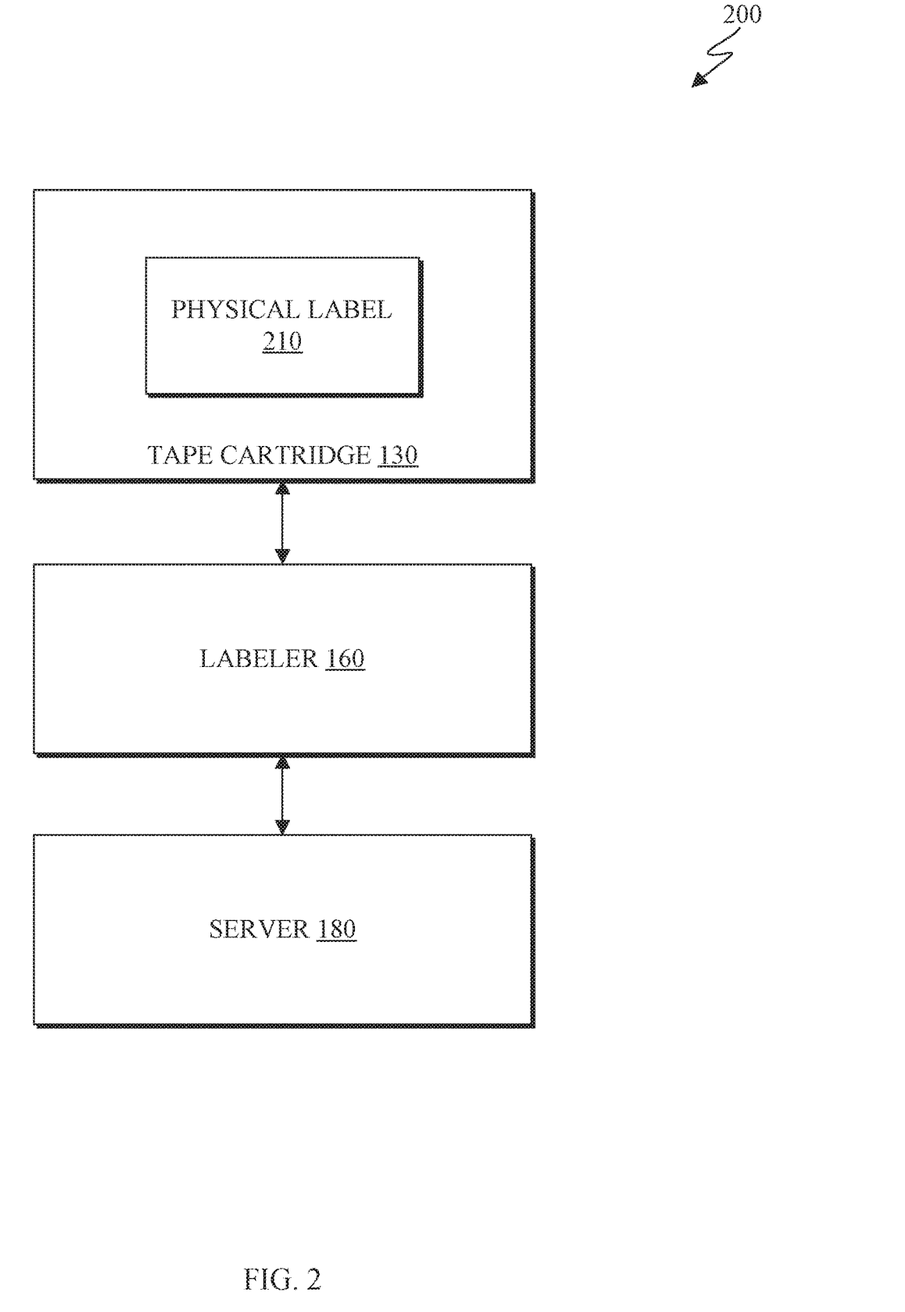
FIG. 2 is a block diagram depicting an example of a cartridge labeling system in accordance with embodiments of the present invention.

FIG. 2 is a block diagram depicting an example of a cartridge labeling system 200 in accordance with embodiments of the present invention. As depicted, cartridge labeling system 200 includes tape cartridge 130 with physical label 210, labeler 160, and server 180. Server 180 may instruct labeler 160 to provide physical label 210 to tape cartridge 130.

Tape cartridge 130 may have a physical label 210. Physical label 210 may be an original or replacement label for tape cartridge 130. Physical label 210 may be a barcode label and may be optically scannable by a barcode reader that may be associated with robot 150, slot 170, and/or labeler 160. In some embodiments, physical label 210 is an RFID tag containing portions of memory to which labeler 160 may write or rewrite data. In other embodiments, the media storage volume is not a tape cartridge such as cartridge 130, but a hard drive, flash drive, floppy drive, optical disc, or the like.

Labeler 160 may apply physical label 210 onto tape cartridge 130. In some embodiments, physical label 210 is an adhesive barcode label that labeler 160 prints and applies onto tape cartridge 130. Physical label 210 may be an optically-scannable label, such as a QR code, UPC-style linear barcode, or the like. Labeler 130 may replace labels by applying a newly-printed label over the replaced label. Labeler 160 may receive instructions to label tape cartridge 130 from server 180. In some embodiments, labeler 160 prints labels using an inkjet or laser-jet printer, and stores sheets containing blank labels in a storage tray or reel.

Figure 3A:
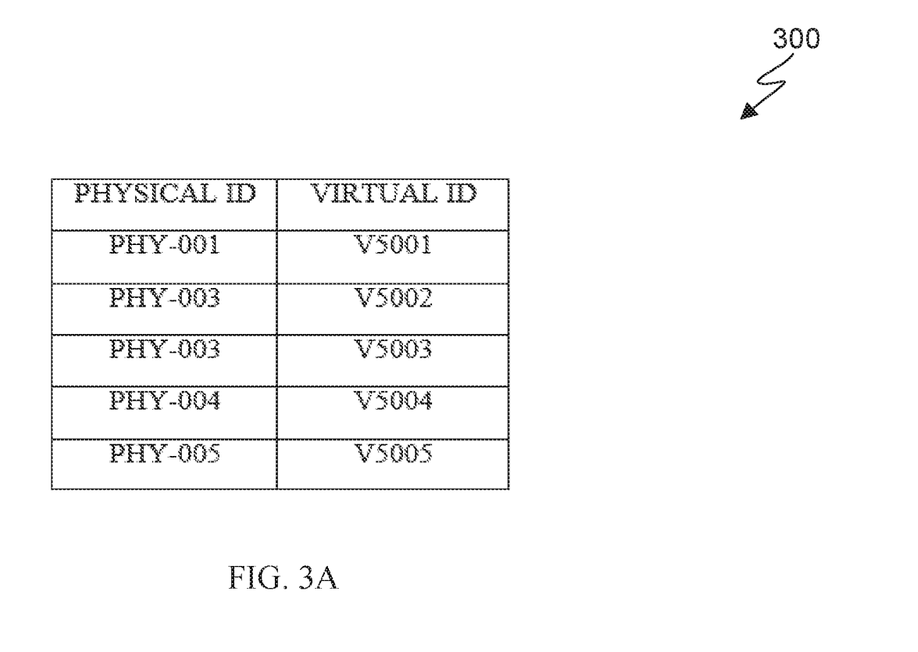
FIGS. 3A and 3B are tables depicting examples of a conversion table in accordance with embodiments of the present invention.
Figure 3B:
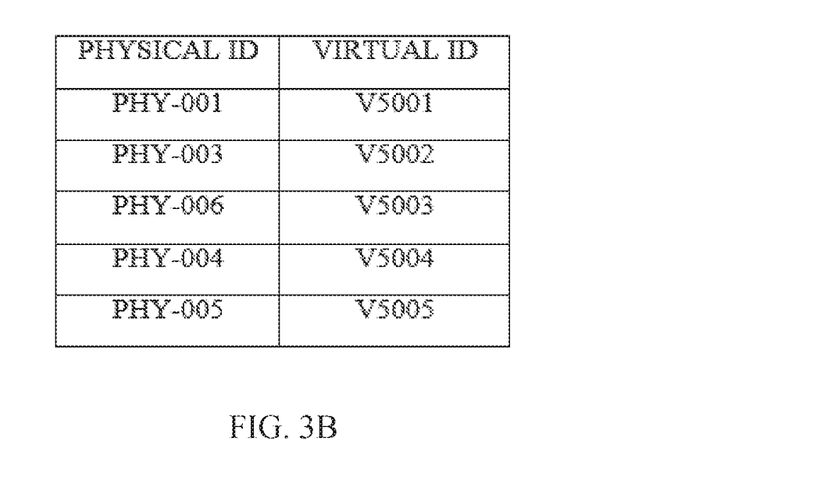

FIGS. 3A and 3B are tables depicting examples of a conversion table 300 in accordance with embodiments of the present invention. As depicted, FIGS. 3A and 3B each have a physical ID column and virtual ID column. Conversion table 300 enables a group volume request for virtual IDs to be translated into physical IDs. Each physical ID may be represented on a cartridge with a physical label such as physical label 210 on tape cartridge 130.

FIG. 3A depicts a conversion table that may be initially generated from a group of tape cartridges whose physical IDs are sequential (e.g., PHY001-PHY005). When storing a multivolume dataset for the first time, it is easy to manage the multiple volumes because a user may select volumes that already have sequential physical IDs. Server 180 may then assign sequential virtual IDs (e.g., V5001-V5005) to match the physical IDs.

FIG. 3B depicts a conversion table that has been updated after one of the volumes of a multivolume group has been replaced. Storage volumes such as tape cartridge 130 may encounter read/write errors that necessitate replacement of the entire cartridge with a new cartridge. In FIG. 3B, the cartridge having a physical ID of PHY003 encountered such an error, so the data stored on it may be transferred to a new cartridge, which has a physical ID of PHY006. Now the dataset can no longer be described as a simple sequential range (e.g. PHY001-PHY005 described the dataset in FIG. 3A) but must be described as PHY001-PHY002, PHY004-006. Conversion table 300 may be updated so that the virtual ID V5003 now refers to PHY006 instead of PHY003. Thus, the dataset may still be described as a simple sequential range via the use of virtual IDs (in this case, V5001-V5005 still describe the dataset both before and after the replacement of cartridge PHY003 with PHY006).

Figure 4:
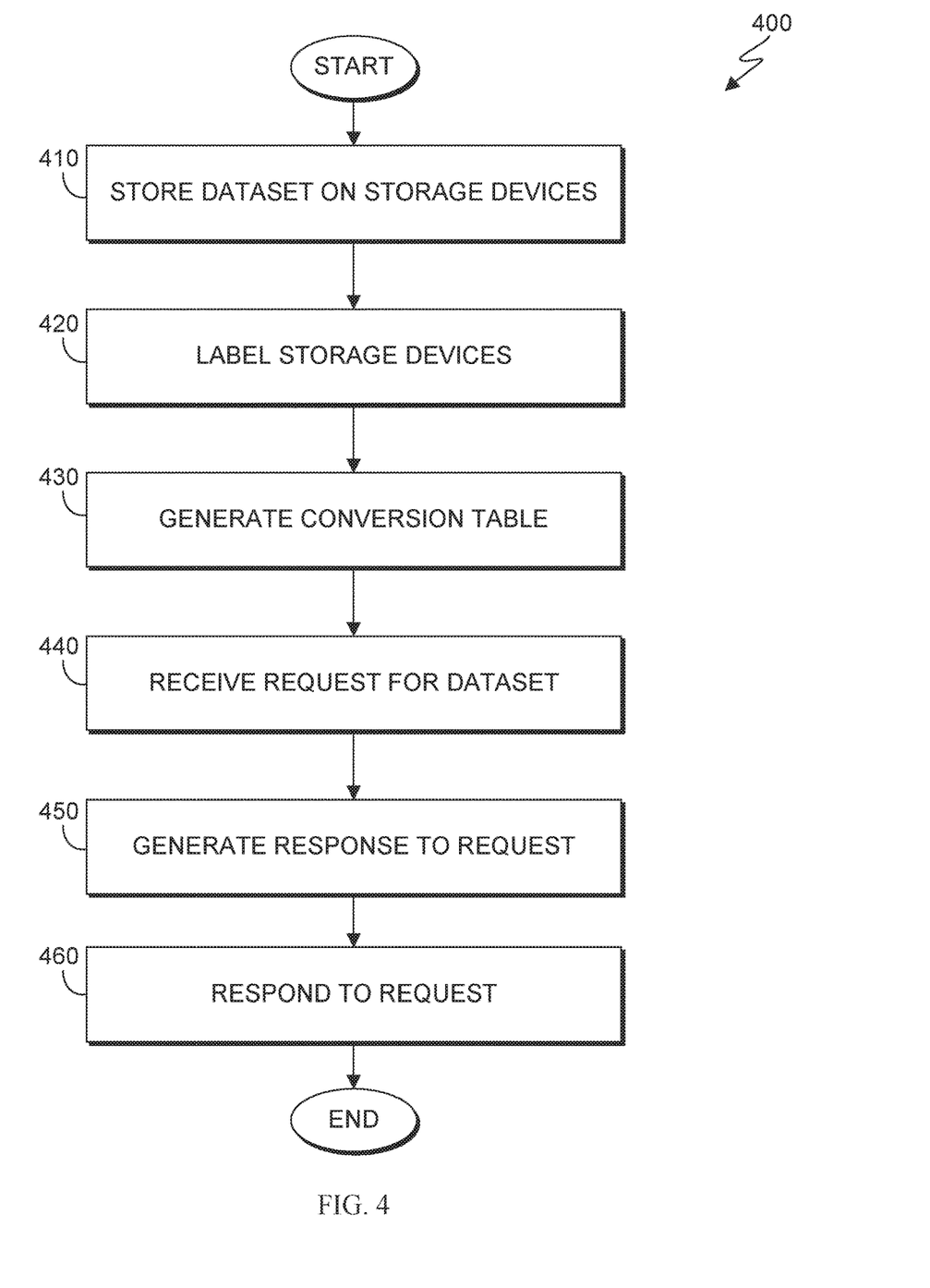
FIG. 4 is a flow chart depicting an example of a multivolume management method in accordance with embodiments of the present invention.

FIG. 4 is a flow chart depicting an example of a multi-volume management method 400 in accordance with embodiments of the present invention. As depicted, multi-volume management method 400 includes storing (410) dataset, labeling (420) storage devices, generating (430) conversion table, receiving (440) request for dataset, generating (450) response to request, and responding (460) to the request. Multivolume management method 400 facilitates the management of datasets that span multiple volumes by ensuring that all of the volumes which make up the dataset can be kept in sequential order.

Storing (410) a dataset on storage devices may include writing a dataset to multiple storage devices such as tape cartridges. Datasets that are too large to fit on any one storage device may span across several. For example, with reference to FIG. 1, if each tape cartridge is capable of storing one gigabyte, and a dataset is 4.5 gigabytes in size, then the dataset may span tape cartridges 130A-130E, with one gigabyte being stored on cartridge 130A, one gigabyte on cartridge 130B, one gigabyte on cartridge 130C, one gigabyte on cartridge 130D, and the remaining 0.5-gigabyte portion of the dataset on cartridge 130E. Thus, in order to describe the dataset, tape cartridges 130A-130E would all need to be available, and in the proper sequence. In some embodiments, sever 180 writes the dataset to the group of tape cartridges 130A-130E and server 180 is responsible for determining how the dataset spans the multivolume group.

Labeling (420) storage devices may include applying an identifying label to each volume of the multivolume group. In some embodiments, labeler 160 labels each tape cartridge 130A-130E with a unique label. While the volumes of a dataset may originally be labeled with a sequential range of physical IDs, changes to volumes may introduce an out-of-sequence physical ID. In such a case, all volumes may be relabeled with a new label corresponding to the updated virtual IDs in order to maintain the multivolume group's sequential range of IDs Server 180 may track the pairing of virtual IDs to physical IDs for each cartridge 130.

Labeling (420) storage devices with replacement labels may enable a multivolume dataset to be described using a range of sequential IDs in the event that the individual tape cartridges do not have sequential physical labels. For example, referring to FIGS. 3A and 3B, regardless of how many individual cartridges in a multivolume group have been swapped out, by relabeling each volume with a label corresponding to the virtual ID, the possibility of sequentially describing multivolume groups is maintained. The labeling operation 420 may occur whenever tape library 110 receives instructions to eject a multivolume group; thus, each volume of the group will be labeled with the most up-to-date virtual ID according to conversion table 300, which will ensure that the multivolume group is labeled with a sequential range of label IDs.

Generating (430) a conversion table may include creating a database that links each virtual ID to physical ID. The conversion table may be created by server 180 or labeler 160 and stored with server 180 and/or tape library 110. Each time a volume is swapped out and with a replacement volume, the conversion table may be updated so that the replaced volume's virtual ID points to the physical ID of the replacement volume. In some embodiments, conversion tables may be stored as conversion table 300 in FIGS. 3A and 3B, with an ordered pairing of physical IDs and virtual IDs. Each time labeler 160 reuses a virtual ID by assigning it to a new physical ID of a replacement cartridge, the conversion table is updated to reflect the new pairing of physical ID and virtual ID. When a label corresponding to a virtual ID replaces a label corresponding to a physical ID, the virtual ID may itself be considered a physical ID from the perspective of a future execution of multivolume management method 400.

Receiving (440) a request for a dataset may include receiving a request in the form of a range of virtual IDs. For example, when a user requests a dataset, the request may be in the form of a range of virtual IDs such as "V5001 to V5005" as depicted in FIGS. 3A and 3B. In some embodiments, a user may request a dataset by inputting its range of virtual IDs, or the name of the dataset, which server 180 may translate into the virtual ID range. Generating (450) a response to request may include translating the virtual ID range request into a response of physical IDs corresponding to those virtual IDs. For example, if a request is for V5001 to V5005, then using conversion table 300 in FIG. 3A, the response generated would be PHY001, PHY002, PHY003, PHY004, and PHY005, in that order (and not represented as a range). If a request is for V5001-V5005 using conversion table 300 in FIG. 3B, then the response may be PHY001, PHY002, PHY006, PHY004, and PHY005. This means that the dataset may be reconstructed in a contiguous and proper order by reading from the beginning of PHY001 to PHY002, to PHY006, to PHY004, and finally to the end of the dataset on PHY005.

Responding (460) to the request may include responding with the generated listing of physical IDs in the correct order. In some embodiments, the tape cartridges corresponding to the physical IDs may be loaded into drives 120A-120C by robot 150 and read sequentially in order to provide the dataset to server 180. If some or all of the tape cartridges whose physical labels correspond to the request physical IDs are not present in enclosure 140 and drives 120A-120C, then the user may be prompted to insert the missing volumes into tape library 110 via slot 170.

Figure 5:
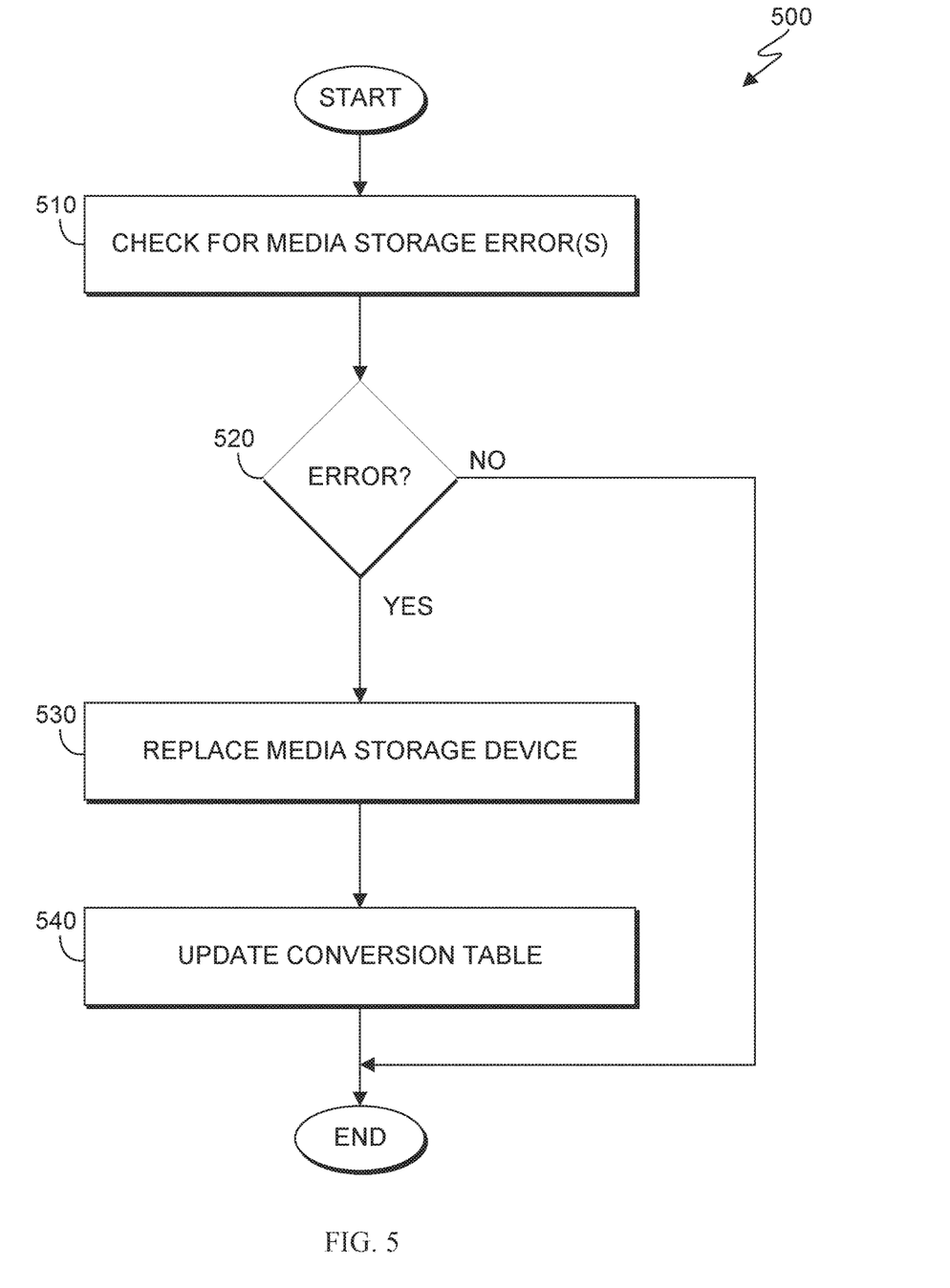
FIG. 5 is a flow chart depicting an example of a volume replacement method in accordance with embodiments of the present invention.

FIG. 5 is a flow chart depicting an example of a volume replacement method 500 in accordance with embodiments of the present invention. As depicted, volume replacement method 500 includes checking (510) for errors, determining (520) whether errors exist, replacing (530) storage devices, and updating (540) conversion table. Volume replacement method 500 enables a dataset to remain definable by a virtual ID range even when individual physical volumes are replaced (which also changes the physical IDs of the volumes).

Checking (510) for media storage errors may include checking the integrity of storage volumes for read/write errors. Errors may include any sort of defect in a media storage device that impacts its ability to store information. Upon determining (520) that there is an error, then volume replacement method 500 may proceed to media replacement operation 530; otherwise, volume replacement method 500 may terminate.

Replacing (530) storage devices may include a removing defective tape cartridge, providing a replacement tape cartridge, and writing to the replacement tape cartridge the portion of the dataset stored previously on the defective tape cartridge. The replacement tape cartridge may have a physical ID that is different from the physical ID associated with the defective tape cartridge.

Updating (540) the conversion table may include updating the physical ID field to reflect that the replacement tape cartridge's physical ID has been assigned to the virtual ID. Following the example of conversion table 300 in FIGS. 3A and 3B, the conversion table of 3B has been updated such that V5003 now corresponds to PHY006. Thus, a request for a dataset in terms of virtual IDs V5001-V5005 will return PHY001, PHY002, PHY006, PHY004, and PHY005 in the appropriate order, since PHY006 replaced defective volume PHY003, which was removed. In some embodiments, the conversion table is updated on-the-fly while volumes are swapped out of a multivolume group that is loaded into tape library 110, and when the group is ejected, all of the volumes receive new physical labels corresponding to their virtual ID.

Thus, volume replacement method 500 detects errors in one or more volumes that make up a multivolume group for a dataset and replace the volumes with new physical media storage. When replacing a volume, the range of physical IDs may be interrupted, so volume replacement method 500 reassigns the virtual ID of the replaced volume to the replacement volume, thereby enabling a dataset to be defined as an uninterrupted, sequential range of virtual IDs.

Figure 6:
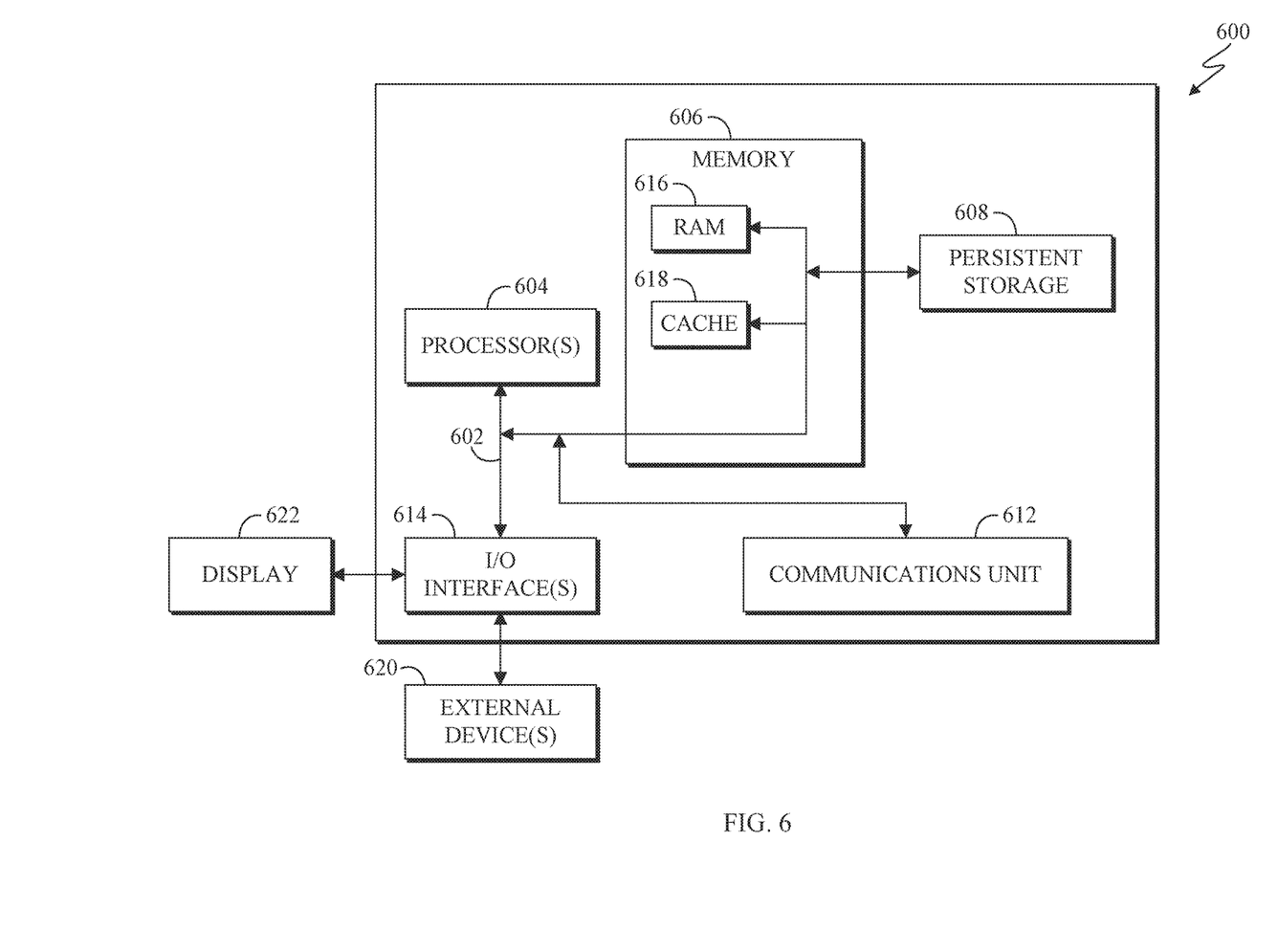
FIG. 6 is a block diagram depicting one example of a computing apparatus (i.e., computer) suitable for executing the methods disclosed herein.

FIG. 6 is a block diagram depicting components of a computer 600 suitable for executing the methods disclosed herein. It should be appreciated that FIG. 6 provides only an illustration of one embodiment and does not imply any limitations with regard to the environments in which different embodiments may be implemented. Many modifications to the depicted environment may be made.

As depicted, the computer 600 includes communications fabric 602, which provides communications between computer processor(s) 604, memory 606, persistent storage 608, communications unit 612, and input/output (I/O) interface(s) 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In the depicted embodiment, memory 606 includes random access memory (RAM) 616 and cache memory 618. In general, memory 606 can include any suitable volatile or non-volatile computer readable storage media.

One or more programs may be stored in persistent storage 608 for execution by one or more of the respective computer processors 604 via one or more memories of memory 606. The persistent storage 608 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links.

I/O interface(s) 614 allows for input and output of data with other devices that may be connected to computer 600. For example, I/O interface 614 may provide a connection to external devices 620 such as a keyboard, keypad, a touch screen, and/or some other suitable input device. External devices 620 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 608 via I/O interface(s) 614. I/O interface(s) 614 may also connect to a display 622. Display 622 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method executed by a computer, the method comprising:
generating, by a processor, a conversion table for a stored dataset, wherein the stored dataset is stored over a plurality of media storage devices, having a corresponding plurality of physical identifiers, wherein in response to determining the dataset is unable to be fully stored on any one of the plurality of media storage devices, the dataset is distributed and stored over two or more of the plurality of media storage devices, wherein the conversion table assigns the plurality of physical identifiers to a corresponding plurality of sequentially ordered virtual identifiers, wherein each physical identifier is uniquely assigned to one virtual identifier;
receiving, by the processor, a request for the stored dataset, wherein the request references the plurality of sequentially ordered virtual identifiers;
in response to receiving the request, generating, by the processor, a response comprising an ordered list of physical identifiers using the conversion table; and
responding, by the processor, to the request with the response.

2. The method of claim 1, further comprising labeling, by the processor, the plurality of media storage devices with the corresponding plurality of sequentially ordered virtual identifiers.

3. The method of claim 2, wherein labeling, by the processor, the plurality of media storage devices comprises printing a barcode label corresponding to the virtual identifier for each media storage device.

4. The method of claim 2, wherein labeling, by the processor, the plurality of media storage devices comprises relabeling each media storage device with a barcode corresponding to the virtual identifier.

5. The method of claim 1, further comprising:
determining, by the processor, that a media storage device is malfunctioning;
replacing, by the processor, the malfunctioning media storage device with a replacement media storage device; and
updating, by the processor, the conversion table by reassigning the virtual identifier to a new physical identifier corresponding to the replacement media storage device.

6. The method of claim 1, wherein each media storage device of the plurality of media storage devices comprises a tape cartridge.

7. The method of claim 6, wherein the plurality of media storage devices store data according to a LTFS standard.

8. A computer system comprising:
one or more computer processors;
one or more computer readable storage media;
program instructions stored therein for execution by at least one of the one or more computer processors, the program instructions comprising instructions for:
generating, by a processor, a conversion table for a stored dataset, wherein the stored dataset is stored over a plurality of media storage devices, having a corresponding plurality of physical identifiers, wherein in response to determining the dataset is unable to be fully stored on any one of the plurality of media storage devices, the dataset is distributed and stored over two or more of the plurality of media storage devices, wherein the conversion table assigns the plurality of physical identifiers to a corresponding plurality of sequentially ordered virtual identifiers, wherein each physical identifier is uniquely assigned to one virtual identifier;
receiving, by the processor, a request for the stored dataset, wherein the request references the plurality of sequentially ordered virtual identifiers;
in response to receiving the request, generating, by the processor, a response comprising an ordered list of physical identifiers using the conversion table; and
responding, by the processor, to the request with the response.

9. The computer system of claim 8, further comprising instructions for labeling the plurality of media storage devices with the corresponding plurality of sequentially ordered virtual identifiers.

10. The computer system of claim 9, wherein labeling the plurality of media storage devices comprises printing a barcode label corresponding to the virtual identifier for each media storage device.

11. The computer system of claim 9, wherein labeling, by the processor, the plurality of media storage devices comprises relabeling each media storage device with a barcode corresponding to the virtual identifier.

12. The computer system of claim 8, further comprising instructions for:
   determining that a media storage device is malfunctioning;
   replacing the malfunctioning media storage device with a replacement media storage device; and
   updating the conversion table by reassigning the virtual identifier to a new physical identifier corresponding to the replacement media storage device.

13. The computer system of claim 8, wherein each media storage device of the plurality of media storage devices comprises a tape cartridge.

14. The computer system of claim 13, wherein the plurality of media storage devices store data according to a LTFS standard.

15. A computer program product comprising:
   a computer readable storage medium and program instructions stored on the computer readable storage medium, the program instructions comprising instructions for:
   generating, by a processor, a conversion table for a stored dataset, wherein the stored dataset is stored over a plurality of media storage devices, having a corresponding plurality of physical identifiers, wherein in response to determining the dataset is unable to be fully stored on any one of the plurality of media storage devices, the dataset is distributed and stored over two or more of the plurality of media storage devices, wherein the conversion table assigns the plurality of physical identifiers to a corresponding plurality of sequentially ordered virtual identifiers, wherein each physical identifier is uniquely assigned to one virtual identifier;
   receiving, by the processor, a request for the stored dataset, wherein the request references the plurality of sequentially ordered virtual identifiers;
   in response to receiving the request, generating, by the processor, a response comprising an ordered list of physical identifiers using the conversion table; and
   responding, by the processor, to the request with the response.

16. The computer program product of claim 15, further comprising instructions for labeling the plurality of media storage devices with the corresponding plurality of sequentially ordered virtual identifiers.

17. The computer program product of claim 16, wherein labeling the plurality of media storage devices comprises printing a barcode label corresponding to the virtual identifier for each media storage device.

18. The computer program product of claim 16, wherein labeling, by the processor, the plurality of media storage devices comprises relabeling each media storage device with a barcode corresponding to the virtual identifier.

19. The computer program product of claim 15, further comprising instructions for:
   determining that a media storage device is malfunctioning;
   replacing the malfunctioning media storage device with a replacement media storage device; and
   updating the conversion table by reassigning the virtual identifier to a new physical identifier corresponding to the replacement media storage device.

20. The computer program product of claim 15, wherein each media storage device of the plurality of media storage devices comprises a tape cartridge.

\* \* \* \* \*